Nov. 24, 1931.  A. D. GALLAGHER  1,832,976.
LISTER PLOW AND PLANTER
Filed Sept. 29, 1927  4 Sheets-Sheet 1
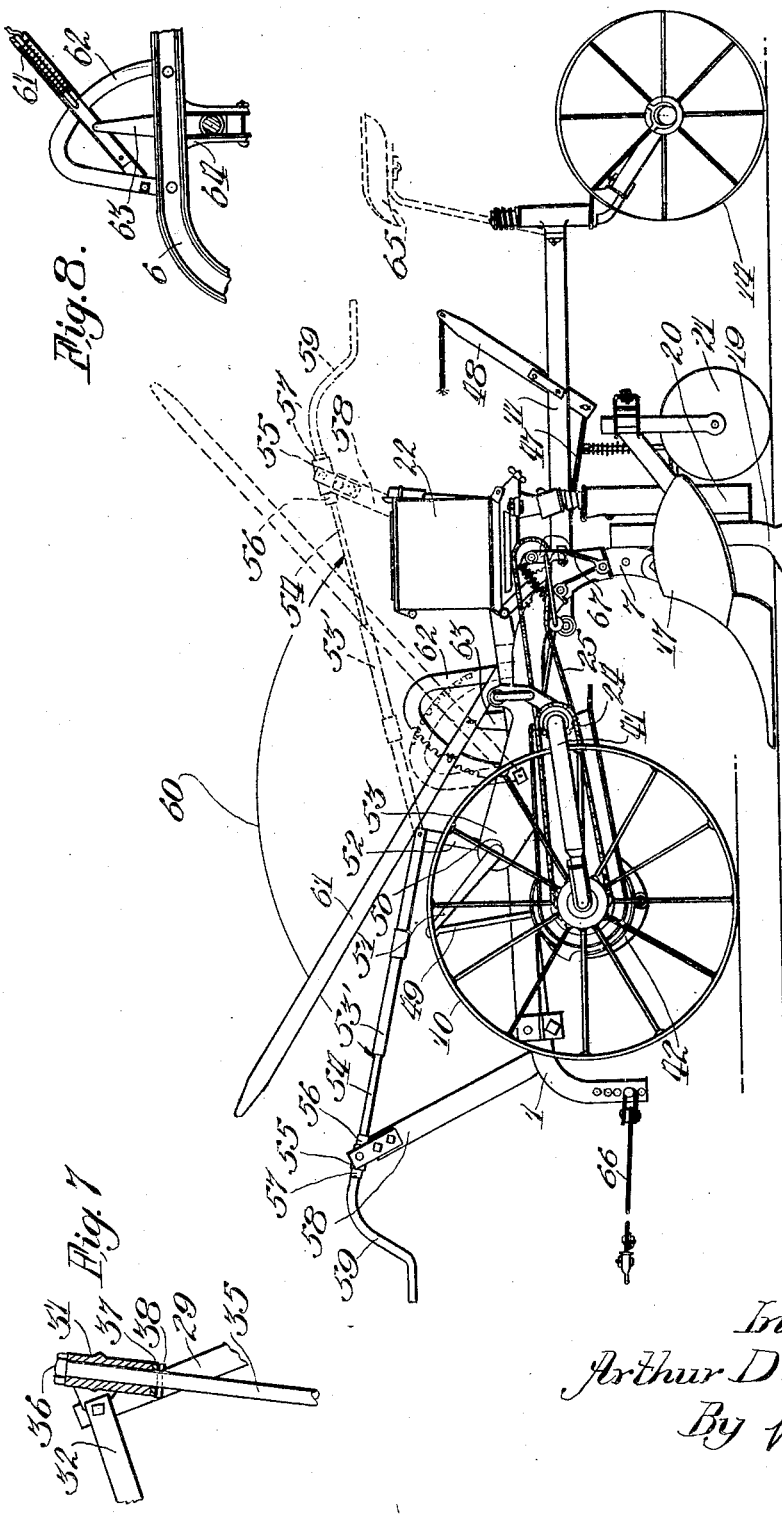
Inventor
Arthur D. Gallagher
By H.P. Doolittle
Atty.

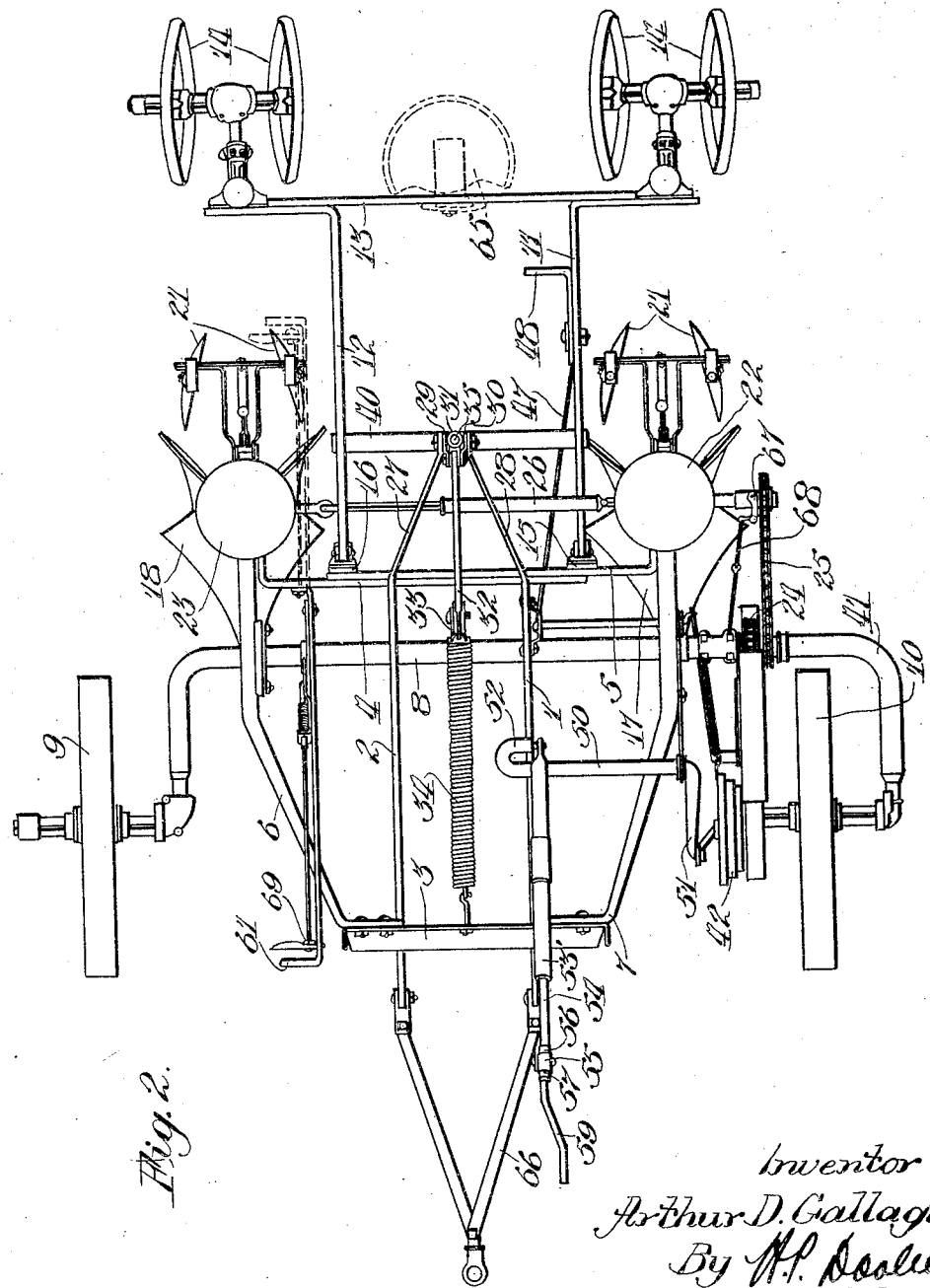

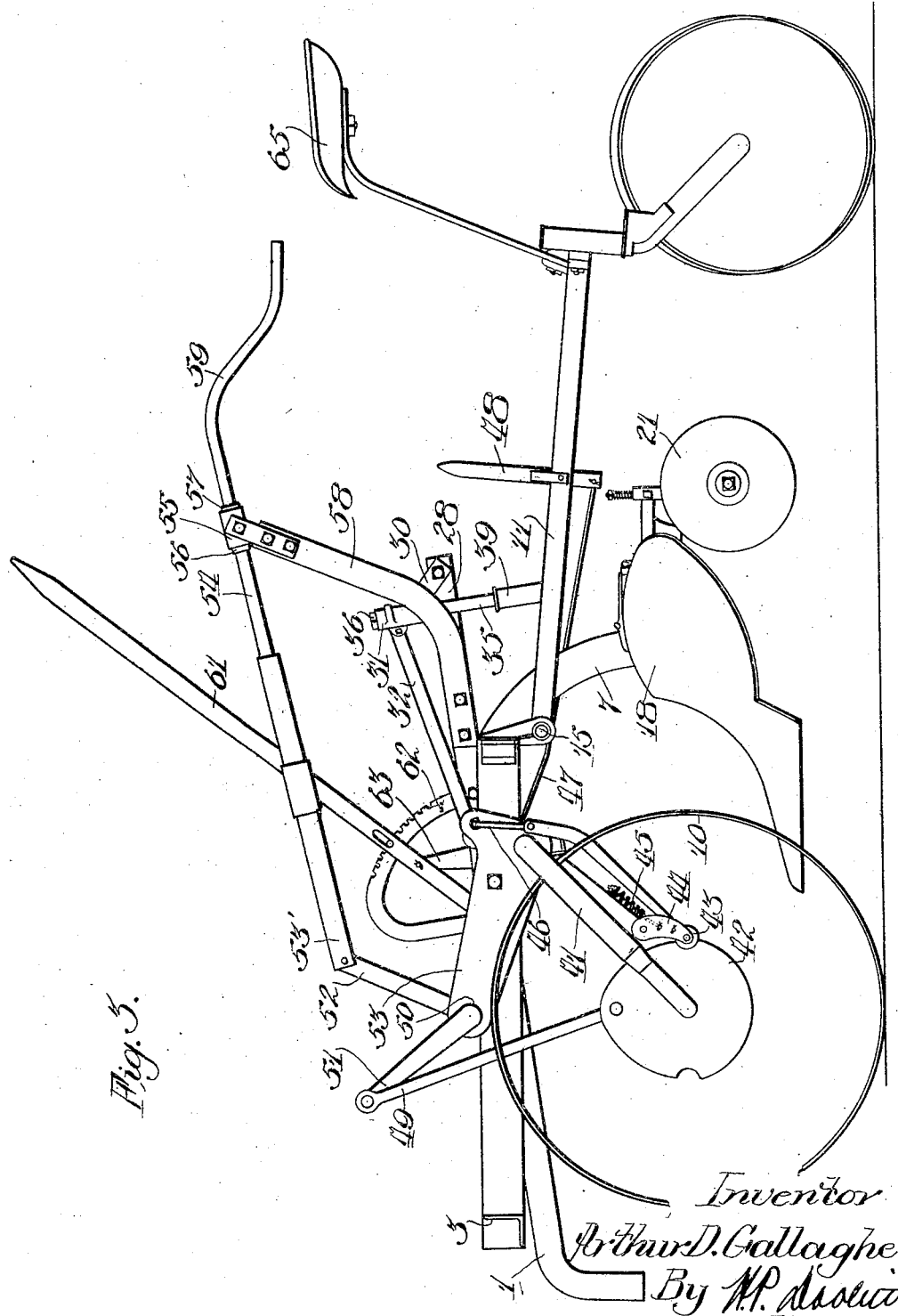

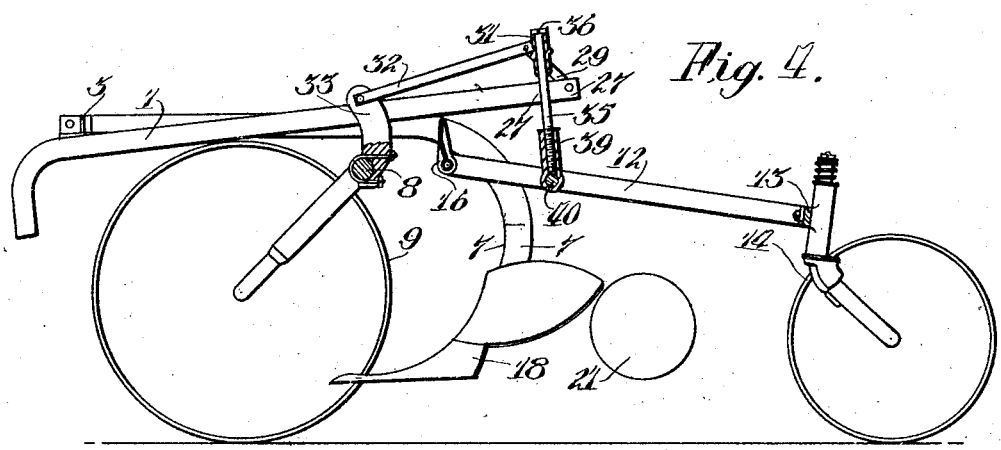
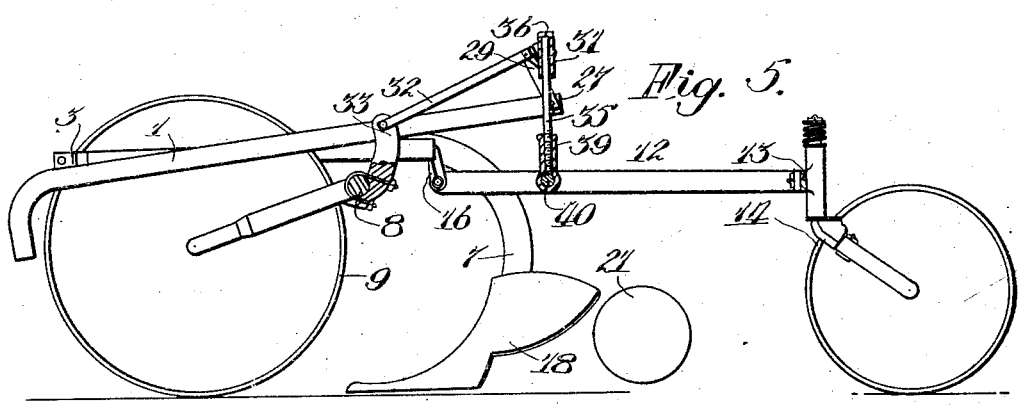
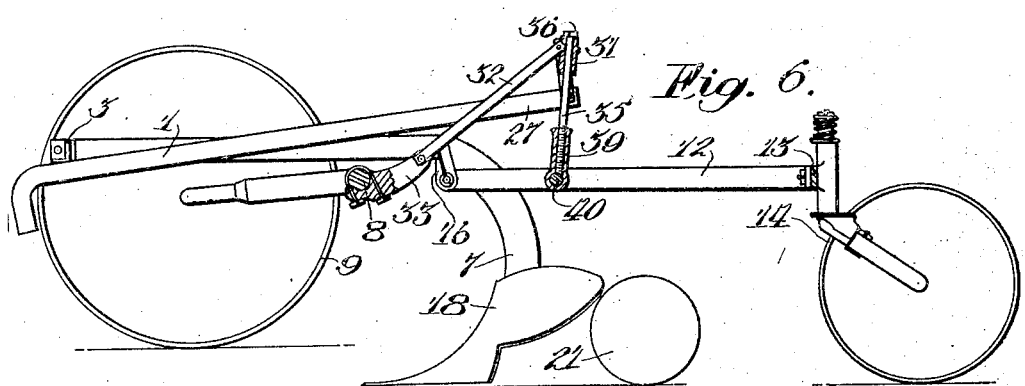

Patented Nov. 24, 1931

1,832,976

UNITED STATES PATENT OFFICE

ARTHUR D. GALLAGHER, OF CANTON, ILLINOIS, ASSIGNOR TO INTERNATIONAL HARVESTER COMPANY, A CORPORATION OF NEW JERSEY

LISTER PLOW AND PLANTER

Application filed September 29, 1927. Serial No. 222,726.

This invention presents improvements in agricultural implements including novel mechanisms for controlling the working elements of such devices.

It is an object of the invention to provide a novel controller for implements to enable the latter to be quickly adapted for tractor or draft animal operation with a minimum of time and effort.

A further object of the invention is to provide a novel mechanism for advantageously controlling a moldboard plow bottom and the appurtenant equipment of a lister planter so that the elevation and depression of the plow bottom is rightly effected.

Further objects of the invention will appear as the following description proceeds.

For illustrating the invention reference is made to the accompanying drawings, in which:

Figure 1 is a side elevation of a lister plow and planter constructed in accordance with the teachings of the invention, indicating the novel mechanism and changes by which the machine is easily convertible from a tractor drawn machine to a horse drawn machine;

Figure 2 is a plan of the lister plow and planter;

Figure 3 is an enlarged side elevation of a part of the machine when arranged for horse operation;

Figure 4 is a diagrammatic view, showing the arrangement of the parts when the plow bottom is fully elevated;

Figure 5 is a view similar to Figure 4 but showing the plow bottom being elevated out of a furrow;

Figure 6 shows the arrangement of the parts when the plow bottom is in the ground and in operative position;

Figure 7 is a detail view of the structure at the upper end of the connector; and Figure 8 is a detail view of the leveling mechanism.

The illustrative implement includes a plow carrying frame comprising the main bars 1 and 2, the front cross angle 3, the rear transverse bars 4 and 5, and the plow beams 6 and 7. The plow beams are turned inwardly at their forward ends, as shown, and are rigidly secured to the angle 3. This frame is supported by a crank axle 8 herein shown as a single transverse shaft upon the opposite ends of which the ground wheels 9 and 10 are rotatably carried.

Shown rearwardly of the plow carrying frame is an auxiliary or wheel supported frame comprising the side bars 11 and 12 united at their rearward ends by the crossbar 13 supported by ground wheels 14. This frame is preferably pivotally connected to the plow carrying frame at 15 and 16, as shown.

Inasmuch as the illustrative machine is a lister, double moldboard plow bottoms 17 and 18 are shown at the ends of the respective plow beams 7 and 6. The conventional subsoiler 19, seed tube 20 and coverers 21 are shown arranged behind the plow bottoms in the order mentioned. Seed dispensing mechanisms 22 and 23 are also shown, these being driven from the wheel 10 through the agency of sprocket chains 24 and 25 and connected by the shaft 26 so as to operate in unison.

As shown in Figures 2 and 3, the frame members 1 and 2 have inwardly bent rearward extensions 27 and 28 preferably extending out over the rear frame. From the end of extension 27 a support herein shown as a link 29 extends upwardly and forwardly. It is pivoted to the extension 27. A similar support or link 30 is similarly related to the extension 28, and between the upper ends of these links a sleeve 31 is located. This sleeve is pivotally carried by the links as shown in the drawings.

The sleeve 31 is also pivotally related to a forwardly extending link 32, which combines with a crank arm 33 fixed upon the shaft 8 to form a toggle connection between the sleeve 31 and the shaft. A counterbalancing spring 34 is secured at one end to the crank arm 33 and at its other end to the front frame member 3. The sleeve 31 forms an upright bearing in which a connecter 35 is rotatably mounted. This element is shown in the form of a long bolt with its head 36 bearing rotatably against the upper end of the sleeve 31. It is rotatably confined on the sleeve between the head 36 and a stop collar 37 held in position on its body by a stop 38, as shown in Figure 7 of the drawings.

At its lower end the connecter is screw-threaded into a T-sleeve 39 secured midway of the balance rod 40 which is preferably rotatably mounted in the frame members 11 and 12, so as to allow the rear frame to have tilting movements on axes extending substantially in the path of movement of the implement. Suitable stops on the member 40 adjacent the frame elements 11 and 12 will prevent the former from moving out of its normal and operative position.

It will be appreciated by one familiar with the power lift plow art that the illustrative plows are elevated by movement of the crank arm 41 of the crank axle 8 from the position shown in Figure 1 to that shown in Figure 3, and that such movement is caused by a known type of power lift clutch 42 which may directly connect the crank arm with one of the supporting wheels. Such a power lift clutch is shown in the patent to Lindgren 1,561,611, November 17, 1925. This clutch is governed by a trip roller 43 carried on an arm 44. This arm is urged toward the clutch by a spring 45 and is released from the intermittently movable clutch member by a train of elements including the link 45, the trip shaft 46, the rod 47, and the foot lever 48.

The movable part of the clutch 42 is connected with the frame by a lifting link 49, as shown in Figure 3 of the drawings. The upper end of the link 49 is pivotally connected to a structure herein illustrated as a combined bell crank lever and crank shaft 50 having the crank arms 51 and 52, the former being pivoted to the leg 49, as shown. The shaft 50 is transversely journaled on the frame, being rotatably mounted in a plate 53 shown secured to the plow beam 7. The crank axle 8 and the trip shaft 46 are likewise rotatably mounted in the plate 53.

Pivotally attached to the arm 52 is a controller comprising a tube 53′ in which is received a threaded crank shaft 54, the latter having a substantially screw-threaded relationship within the former. The shaft 54 is rotatable within a stop sleeve 55 confined on the shaft between stop collars 56 and 57, which are fixed on the shaft. The sleeve is pivotally supported on a fixed support 58 herein shown as a bracket secured to the frame of the machine. At the end of the shaft a suitable hand crank 59 is formed. This structure affords an easily operable manual control mechanism for governing the working of the machine.

Figure 3 shows an arrangement of the above described elements when the implement is to be horse drawn. In this case the working elements are controllable from the rear of the machine. When the implement is to be tractor operated, the bracket 58 is disconnected from the frame at its lower end and the controller is turned upwardly about the axis of its connection with the arm 52 to the position shown in Figure 1. The bracket is bolted to the frame in reverse position and the working elements of the machine may then be controlled conveniently from the seat of a tractor.

In Figure 1 the arrow 60 indicates the movement of the controller when the implement is changed from a tractor operated machine to a horse drawn machine, the dotted line position of the controller indicating a position corresponding to the position in which it is shown in Figure 3 of the drawings.

Figure 8 shows the leveling mechanism including the lever 61 which is operable to elevate or lower one end of the crank axle 8 when one supporting wheel is running at a lower level than the other. This lever is pivoted at one end to a reversible detent sector 62 fixed (secured) to the frame either in the position indicated in Figure 8 or that shown in dotted lines in Figure 1. A link 63 pivoted to the lever 61, as shown, is pivotally associated with the crank axle at its other end. The crank axle is vertically guided by the downwardly extending parts of a guide bracket 64 fixed to the frame. When the implement is to be tractor operated, the lever 61 and its associated mechanism are fixed, as shown in full lines in Figure 1, but when the implement is to be horse drawn the lever is detached from the link 63, the sector 62 is detached from the frame and reversed, and these parts are then secured in the positions indicated by the dotted lines of Figure 1, so that the lever 61 is accessible to the operator located on the seat 65. The implement is then arranged as a horse drawn machine.

Among the elements shown in the drawings and not already described are the draft device 66, the clutch shipper lever 67, and the clutch links 68, the latter elements serving to disconnect the drive from the dispensing mechanisms as the plow bottoms are elevated. A detent mechanism 69 for the lever 61 is also shown.

*The operation of the illustrative machine*

When the described implement is in operation and is actually plowing and planting, the plow bottoms are positioned as shown in Figures 1 and 6 of the drawings. The plow bottoms are here shown at a working depth well below the level at which the ground wheel is running. Under these conditions, it is to be noted that the crank axle 8 is in such position that its crank arm 33 extends substantially in a line passing through the center of the crank axle and the upper end of the connecter 35. At this time, the link 32 is also positioned in substantially the same alinement, as shown in Figure 6 of the drawings.

When the machine approaches the end of the field and it is desired to make the plowing and planting devices inoperative, the attendant pushes the foot lever 48 forwardly. This action releases the stop roller 43 from its notch in the clutch 42 the movable member of which then moves one half a revolution with the connected ground wheel 10. This action causes the front frame to be pushed upwardly, the thrust being transmitted by the lifting link 49. At the beginning of this action, the crank axle and crank arm 33 begin to move counter-clockwise, referring to the manner in which they are shown in Figure 6 of the drawings. This movement has the effect of breaking the toggle mechanism formed by the parts 32 and 33.

As the lifting action proceeds the crank arm 33 gets around so that it is moving almost directly away from a position at the top of the connecter as it is shown in Figure 6. At this time the connecter is moved downwardly and forwardly relative to the front frame at a relatively rapid rate and the two frames are moving relative to each other at their most rapid rate. The plow bottom moves upwardly to a position in which it is substantially parallel to its position when in the ground and in operative position. This action takes place without any lost motion action or lost motion connection between the parts, such connections or actions being objectionable because of their tendency to allow the plow bottoms to bob up and down while the machine is plowing and because of attendant destructive wear and jarring of the machine parts.

When the plow bottoms are in their extreme elevated positions all of their appurtenant devices, including the subsoilers, seed tubes, and coverers, are raised to the same extent as indicated in Figure 3 of the drawings. This result enables the implement to be conveniently transported over rough roads and fields without obstruction. Ample road clearance is thus provided for all of the operative parts.

While the invention has been described with reference to a particular machine, it is to be understood that it is not limited to the details of that machine, but that the invention is of a scope indicated by the subjoined claims.

What is claimed is:

1. A tillage implement comprising a wheel supported plow carrying frame, a wheel supported auxiliary frame, said frames being pivotally connected together, a crank axle for elevating the frames, a crank arm fixed to said axle, a support pivoted at one end to one of the frames, a link pivotally connecting the crank arm and the support, and a threaded connecter pivotally and rotatably carried at the other end of the support and pivotally connected to the other frame, the turning of the connecter operating to vary the positioning of the frames for a given rotative movement of the axle.

2. A tillage implement comprising a plow carrying frame, a plow bottom rigidly carried by said frame, a wheel supported auxiliary frame pivotally connected to the first mentioned frame, a crank axle rotatably mounted with respect to the plow carrying frame, and a toggle connection between the axle and the auxiliary frame, and means including said toggle connection operable to cause the two frames to so move relative to each other that the plow bottom is brought into elevated inoperative position substantially parallel to its operative position.

3. A tillage implement comprising a wheel supported plow carrying frame, a wheel supported auxiliary frame, said frames being pivotally connected together, a rockable shaft for elevating the plow frame, a crank arm fixed to said shaft, a support pivoted at one end to one of the frames, a link pivotally connecting the crank arm and the support, and a turnable connecter pivotally and rotatably carried at the other end of the support and pivotally and screw-threadedly connected to the other frame, the turning of the connecter operating to vary the positioning of the frames for a given rotative movement of the shaft.

4. A tillage implement comprising, in combination, a front frame including a central rearward extension, a wheel supported rear frame, said frames being pivotally connected together on a transverse axis at laterally spaced points, a plow bottom carried by the front frame, a ground wheel supported crank axle supporting the front frame, means for turning the crank axle to elevate or lower the front frame, an upright connecter rod pivotally connected with the rearward extension of the front frame and with the rear frame at positions spaced rearwardly from the axis of the pivotal connection between the frames, a crank arm fixed to the crank axle, and a link pivotally connecting the crank arm to said connecter rod for controlling the pivotal movement between the frames.

In testimony whereof I affix my signature.

ARTHUR D. GALLAGHER.